(12) United States Patent
Kronenthaler et al.

(10) Patent No.: US 12,446,945 B2
(45) Date of Patent: Oct. 21, 2025

(54) CRYOPROBE

(71) Applicant: Erbe Elektromedizin GmbH, Tuebingen (DE)

(72) Inventors: Joerg Kronenthaler, Hirrlingen (DE); Marcus Adler, Burladingen (DE)

(73) Assignee: Erbe Elektromedizine GmbH, Tuebingen (DE)

(*) Notice: Subject to any disclaimer, the term of this patent is extended or adjusted under 35 U.S.C. 154(b) by 824 days.

(21) Appl. No.: 16/928,720

(22) Filed: Jul. 14, 2020

(65) Prior Publication Data
US 2021/0022788 A1 Jan. 28, 2021

(30) Foreign Application Priority Data

Jul. 23, 2019 (EP) ..................... 19187779

(51) Int. Cl.
A61B 18/02 (2006.01)
A61B 10/04 (2006.01)
A61B 17/00 (2006.01)
A61B 18/00 (2006.01)
A61L 29/02 (2006.01)

(52) U.S. Cl.
CPC .............. A61B 18/02 (2013.01); A61B 10/04 (2013.01); A61L 29/02 (2013.01); A61B 2017/00323 (2013.01); A61B 2018/00505 (2013.01); A61B 2018/0212 (2013.01); A61B 2018/0268 (2013.01)

(58) Field of Classification Search
CPC ..................................... A61B 18/02
See application file for complete search history.

(56) References Cited

U.S. PATENT DOCUMENTS

| 5,285,795 | A | 2/1994 | Ryan et al. | |
| 5,409,453 | A | 4/1995 | Lundquist et al. | |
| 5,573,532 | A | * | 11/1996 | Chang ................... B23K 1/008 606/26 |
| 6,241,722 | B1 | * | 6/2001 | Dobak ................... A61B 18/02 606/23 |
| 6,270,476 | B1 | 8/2001 | Santoianni et al. | |
| 6,981,382 | B2 | * | 1/2006 | Lentz ..................... A61B 18/02 62/119 |
| 8,308,718 | B2 | 11/2012 | Fischer et al. | |

(Continued)

FOREIGN PATENT DOCUMENTS

CN 1703168 A 11/2005
CN 101011270 A 8/2007
(Continued)

OTHER PUBLICATIONS

Office action issued in counterpart Chinese Patent Application No. CN108784824A (9 pages).

Primary Examiner — Ronald Hupczey, Jr.
(74) Attorney, Agent, or Firm — Blank Rome LLP

(57) ABSTRACT

A cryoprobe having a head to which cryofluid is supplied via a capillary tube. A hose serves for removal of the cryofluid, wherein the capillary tube extends through the lumen thereof. The capillary tube comprises a flexible section that is bridged by a pull element. In this manner a cryoprobe that can be handled well is obtained that can be easily and very largely bent and still transmits tensile forces for sample extraction.

26 Claims, 2 Drawing Sheets

(56) References Cited

U.S. PATENT DOCUMENTS

| | | | |
|---|---|---|---|
| 2003/0040740 A1* | 2/2003 | Kovalcheck | A61B 18/02 |
| | | | 606/21 |
| 2005/0065483 A1 | 3/2005 | Nakao | |
| 2008/0033414 A1 | 2/2008 | Levin et al. | |
| 2009/0204021 A1 | 8/2009 | Shabaz et al. | |
| 2010/0016847 A1 | 1/2010 | Fischer et al. | |
| 2010/0113971 A1 | 5/2010 | Hibner | |
| 2010/0121269 A1 | 5/2010 | Goldenberg et al. | |
| 2011/0071427 A1 | 3/2011 | Fischer et al. | |
| 2012/0029494 A1 | 2/2012 | Wittenberger et al. | |
| 2014/0228831 A1 | 8/2014 | Fischer et al. | |
| 2014/0316399 A1 | 10/2014 | Quantock | |
| 2015/0265329 A1 | 9/2015 | Lalonde et al. | |
| 2016/0066896 A1 | 3/2016 | Abner et al. | |
| 2016/0206295 A1 | 7/2016 | Kramer et al. | |
| 2018/0140342 A1 | 5/2018 | Fischer et al. | |

FOREIGN PATENT DOCUMENTS

| | | |
|---|---|---|
| CN | 101390774 A | 3/2009 |
| CN | 102151172 A | 8/2011 |
| CN | 102378600 A | 3/2012 |
| CN | 104411263 A | 3/2015 |
| CN | 107837108 A | 3/2018 |
| CN | 108784824 A | 11/2018 |
| DE | 10045036 C1 | 7/2002 |
| EP | 3 323 366 A1 | 5/2018 |
| EP | 3398547 A1 | 11/2018 |
| JP | 2010512873 A | 4/2010 |
| RU | 1818088 C | 5/1993 |
| RU | 154699 U1 | 9/2015 |
| WO | 9852625 A1 | 11/1998 |
| WO | 2014189601 A1 | 11/2014 |

* cited by examiner

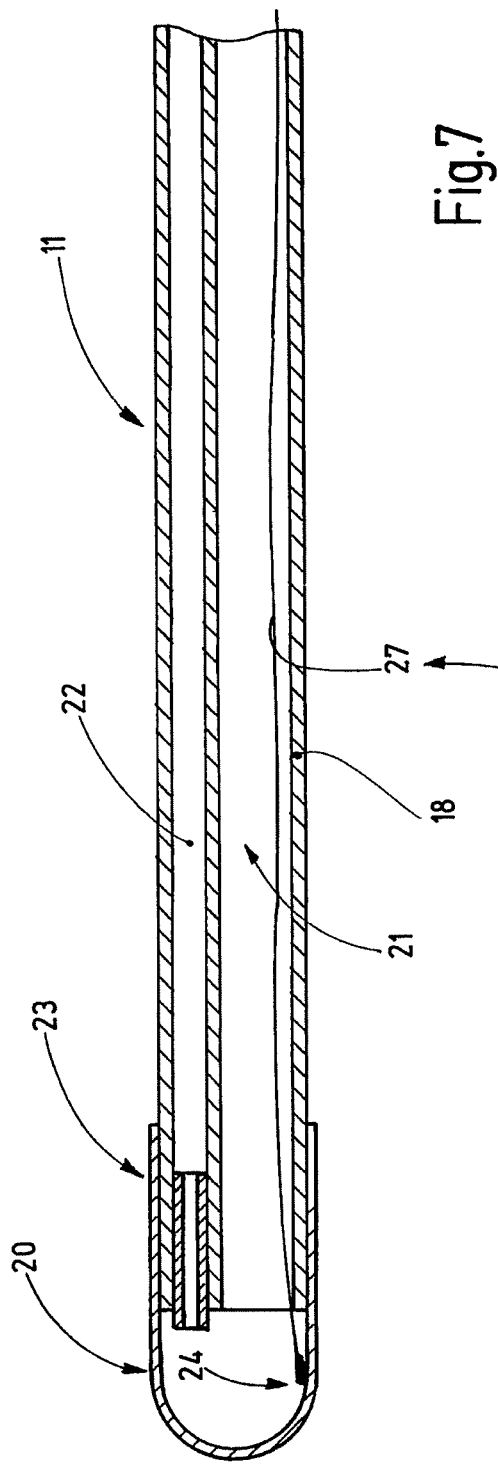
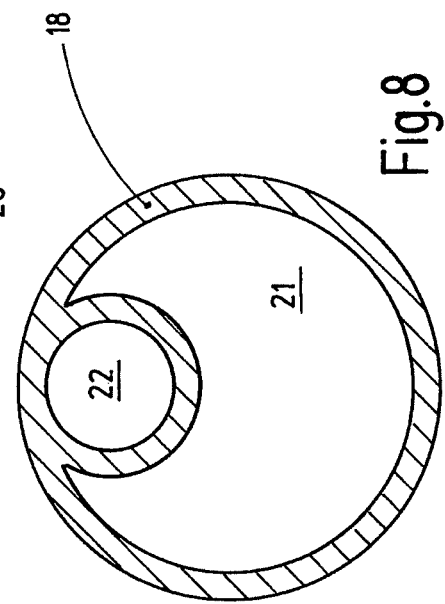

CRYOPROBE

CROSS REFERENCE TO RELATED APPLICATION

This application claims priority to European application No. 19187779.4, filed Jul. 23, 2019, the entirety of which is incorporated by reference herein.

TECHNICAL FIELD

Embodiments of the invention refer to a cryoprobe that is particularly suitable for taking a tissue probe in highly branched vessel systems, as e.g. for taking a tissue sample in the upper urinary tract, especially in the renal calix system.

BACKGROUND

Cryoprobes for tissue biopsy are known in principle. For example DE 10 2011 000 004 B4 discloses a flexible cryoprobe having a hose comprising a lumen and at the distal end of which a metallic head in the form of a cup is arranged, the diameter of which corresponds to the diameter of the hose and that comprises a rounded bottom at its distal end. A capillary tube is arranged in the hose that extends over the total length of the hose and ends inside the head. The capillary tube serves to introduce cryofluid in the head for the cooling thereof.

Similar cryoprobes are known from EP 2 257 235 B1, EP 2 170 197 as well as EP 2 114 276 B1.

During tissue sampling the distal end of the probe is cooled thus far that the tissue that is to be sampled freezes to the head of the probe. The tissue has to be separated from the non-frozen tissue subsequently, i.e. torn off and guided out of the lumen of the patient together with the probe. In branched lumen it additionally depends on being able to bend the probe with small bending radius, wherein a bending of remarkably more than 90° can be desired.

SUMMARY

Starting therefrom it is the object of embodiments of the invention to provide a cryoprobe that is suitable for such a demanding use.

This object is solved, for example, by a cryoprobe according to claim 1.

An embodiment of the inventive cryoprobe comprises a hose that is provided with a head at its end that serves for tissue sampling. A capillary tube extends through the lumen of the hose in order to supply the head with cryofluid. The capillary tube is a conductor, the pressure resistance of which matches the used cryofluid.

In addition, a pull wire is arranged in the lumen of the hose that serves to transmit tensile forces between the head and proximal end of the cryoprobe. This allows the use of a capillary tube that is highly flexible in one or multiple sections or as a whole and on the other hand also the transmission of the necessary pulling forces from the proximal end on the head in order to tear off tissue frozen to the head from non-frozen tissue and thus to take a tissue probe.

In one embodiment, the inventive cryoprobe is flexible such that it can be bent with application of low force in large angles and it unites this with high tensile strength.

The cryoprobe can be configured in a filigree manner and can have an outer diameter of less than 1.2 mm such that it is usable also in very narrow endoscopes. Bending angles, i.e. a bending of more than 150° preferably more than 160° can be achieved with embodiments of the inventive concept. In doing so, due to the high flexibility of the cryoprobe, the angling can be carried out with low force that has to be applied by the endoscope.

Preferably the capillary tube is manufactured from a material in which an increase or decrease of its tensile strength can be achieved by an influence, e.g. a heat treatment. It is further preferred that the capillary tube is treated or processed such that it comprises at least one section in which the tensile strength of the material and thus also the bending resistance of the capillary tube is reduced compared with the tensile strength and thus also the bending resistance of the remaining capillary tube. This section with reduced tensile strength and reduced bending resistance is preferably arranged in this distal section that is angled by the endoscope in use. The capillary tube consists, for example, of steel or another material having tensile strength and being resistant to bending. In the section in which the probe is to be bent with a small bending radius, the steel can be soft-annealed, for example. Alternatively, it is possible to form this section by a capillary tube piece of another material, e.g. plastic, copper or the like.

The pull wire serves to transmit tensile forces from the proximal end to the head of the probe. It is arranged spanning at least the soft section of the capillary tube. For this the pull wire is connected with the head of the instrument at the distal end in a tensile-force-proof manner. For this the pull wire can be directly attached to the head or also to a tensile-force-proof section of the capillary tube that is in turn connected with the head.

The distal end of the pull wire can lead to the distal end of the probe or, as it is preferred, can be connected with the tensile-force-proof distal section of the capillary tube. Thus the pull wire spans at least the section of the capillary having a reduced bending resistance.

The pull wire can be connected with the capillary tube in a tensile-force-proof manner, e.g. via welding points, weld seams or other types of connection. Preferably the pull wire is placed parallel to the capillary tube, i.e. the connection locations between the pull wire and the capillary tube are with respect the capillary cross-section arranged in the same angular position. In doing so, a free angular movement of the probe in all radial directions is allowed.

Although it is basically possible to bridge the angular flexible section of the capillary tube with multiple pull wires, it is preferred to provide only one pull wire. In doing so, a good movability of the cryoprobe in all directions is obtained.

The diameter of the pull wire is preferably lower than the difference between the diameter of the lumen and the outer diameter of the capillary tube. In doing so, the capillary tube as well as the pull wire remain movable in radial and circumferential direction inside the lumen. During bending of the probe, in which the pull wire is positioned radially outward in relation to the bending radius, at least the center section of the pull wire can move in the lumen and can reach the opposite side of the lumen. In doing so, also in this case the pull wire does not oppose a resistance to a bending.

BRIEF DESCRIPTION OF THE DRAWINGS

Further details of advantageous embodiments of the invention yield from the drawings, the description and the claims. The drawings show:

DETAILED DESCRIPTION

Figure 1:
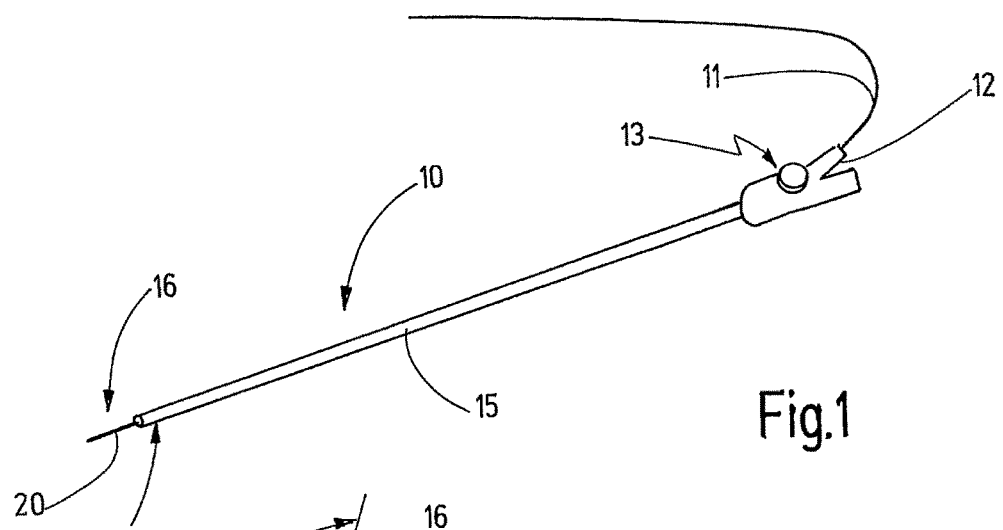
FIG. 1 an endoscope with an embodiment of an inventive probe in schematic perspective illustration, FIG. 2 the distal end of the endoscope with probe in bent condition, FIG. 3 the distal end of the probe in a schematic longitudinal sectional illustration, FIG. 4 a portion of the distal end of the probe in a schematic longitudinal sectional illustration, FIGS. 5 and 6 sectional illustrations of the probe according to FIG. 4 cut along the lines V-V or VI-VI respectively, FIG. 7 an alternative embodiment of the instrument, FIG. 8 the instrument according to FIG. 7 in cross-section.

FIG. 1 illustrates an endoscope 10 in which a cryoprobe 11 is inserted. It extends from the proximal end 12 of the endoscope up to the distal end 14 that is movable by means of operating elements 13. The endoscope 10 comprises a longitudinal shaft 15, wherein the cryoprobe 11 is guided through a channel thereof. The distal end 16 of the cryoprobe 11 can be retracted into the shaft 15 or shifted out of the shaft 15. The outer diameter of the cryoprobe 11 is preferably slightly smaller than the inner diameter of the channel provided in the shaft 15.

Figure 2:
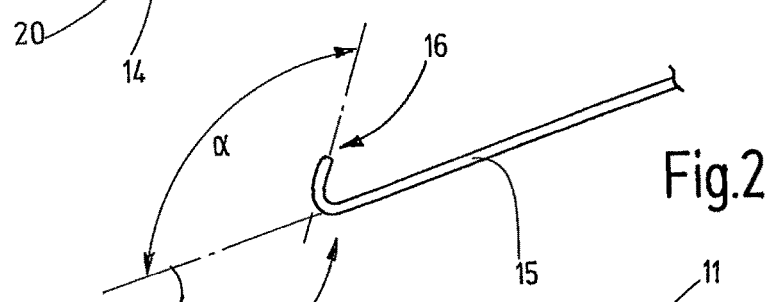

The operating elements 13 serve to control the distal end 14 of the shaft 15, particularly to selectively bend it relative to the axial direction 17 that, as shown in FIG. 2, extends along the shaft 15. The angle $\alpha$ that can be achieved thereby is preferably larger than 90° and further preferably larger than 140° and in the preferred case larger than 160°. The bending radius is thereby smaller than 20 mm, preferably smaller than 15 mm in case of an outer diameter of the shaft 15 of less than 3.3 mm.

Figure 3:
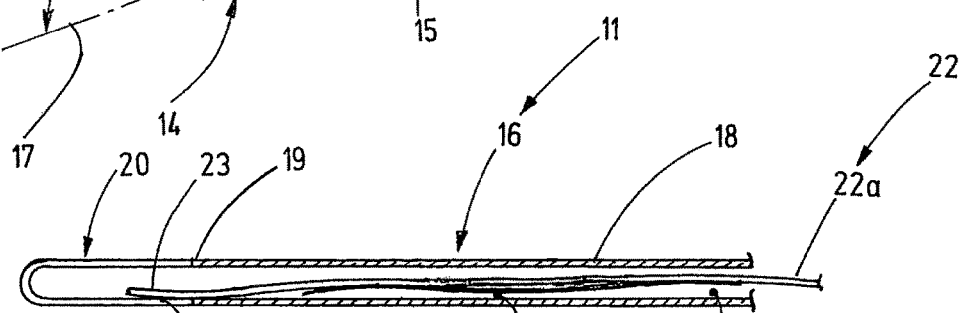

In FIG. 3 the cryoprobe 11 is individually illustrated in the area of its distal end 16. It comprises a hose 18 at the distal end 19 of which a head 20 is attached in fluid tight manner. The hose 18 surrounds a lumen 21 and is at least highly flexibly configured at least in the section adjoining the head 20. The head 20 is schematically illustrated in FIG. 3. It preferably comprises an outer diameter that corresponds to the outer diameter of the hose 18. At its distal end the head 20 is closed by a planar, curved or otherwise configured bottom.

In addition, the hose is provided with a fluid channel 22 that serves to guide cooling fluid to or in the head 20. The fluid channel 22 can be formed by a capillary tube 22a that extends through the lumen 21 of the hose 18. The capillary tube 22a can be connected with head 20 at its head-side end 23. The connection can be established by not further illustrated connection elements or, as obvious from FIG. 3, directly by a weld seam 24, a weld point or the like.

The capillary tube 22a can be open at its distal end or can be provided with a nozzle. The nozzle can also be formed on the capillary tube. Preferably the capillary tube 22a consists of a tensile-force-proof steel, e.g. X2CrNiMo 1.4404 or X2CrNiMo 1.4401. Preferably the material of the capillary tube 22a has a tensile strength of more than 900 N/mm². The capillary tube 22a serves to insert cryofluid in the inner space of the head 20 for cooling thereof, as well as for transmission of tensile forces during the biopsy sampling.

Figure 4:
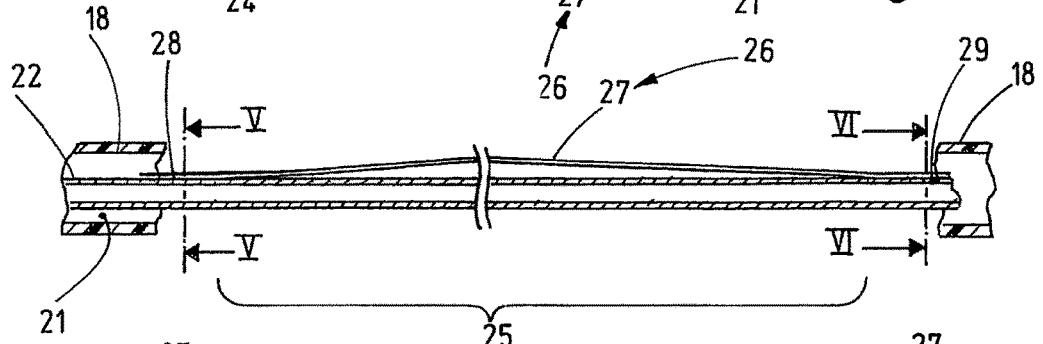

The capillary tube 22a is, however, not continuously configured in a tensile-force-proof manner. In its section 25, that is individually illustrated in FIG. 4, the capillary tube 22a is reduced in its tensile strength and thus also in its bending resistance by a heat treatment, e.g. by softening. Preferably the tensile strength in this section is less than 700 N/mm². In doing so, the capillary tube 22a is also in the section 25 able to resist a pressure load caused by the cryofluid. It is in addition flexible such that the cryoprobe can be bent with a small bending radius, as indicated in FIG. 2. However, section 25 has not enough tensile strength, in order to transmit the necessary tensile forces for biopsy sampling.

The section 25 is bridged by a pull element 26 that is a pull wire 27 in the present embodiment. It consists of a tensile-force-proof material that transmits the tensile forces necessary for the biopsy sampling within its elastic stress in connection with the capillary tube 22a. The pull wire 27 is connected at its two ends by weld connections 28, 29, e.g. weld seams, with the capillary tube 22a that also transmits the tensile forces within its elastic stress. The pull element 26, however, keeps tensile stresses to a large extent away from the softened location of the capillary tube 22a. Measured along the length of the capillary tube 22a the distance of the weld seams 28, 29 from each other is, however, larger than the length of the section that is reduced in its tensile strength and bending resistance compared with the remaining capillary tube 22a.

Figures 5, 6:
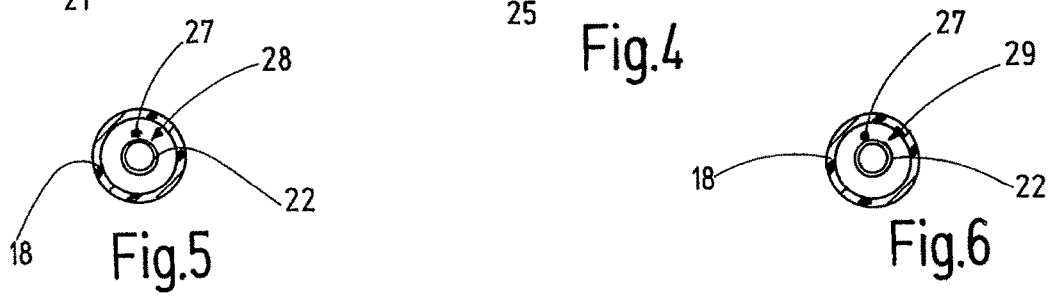

This is illustrated in FIGS. 5 and 6, which also make apparent that the weld connections 28, 29 at the two ends of the pull wire 27 are arranged at the same radial position of the capillary tube 22a. Between the two weld connections 28, 29 the pull wire 27 is in non-tensioned (slack) and transversely movable contact with the capillary tube 22a or extends with low distance thereto, as indicated in FIG. 3. In this orientation the pull wire 27 is largely orientated parallel to the capillary tube 22a.

For biopsy sampling the cryoprobe 11 is inserted into a lumen of the patient with the endoscope 10 and the distal end 16 is brought into contact with the tissue of the patient to be sampled or is penetrated therein. The insertion of the cryoprobe 11 in the endoscope 10 is particularly simplified in that the cryoprobe 11 is rigid—corresponding to the rigidity of the capillary tube 22a—nearly along its total length, i.e. more rigid than section 25. The instrument is, however, flexible as a whole. Only the portion of the length defined by section 25 is less bending resistant and easier to bend.

The endoscope can be bent in an angle of over 160° if necessary, as illustrated in FIG. 2. In doing so, the endoscope 10 and the cryoprobe 11 can be inserted into narrow and highly branched vessels of a patient. Thereby the cryoprobe 11 is dimensioned such that the section 25 is located in the region of the bending location of the endoscope. The length of section 25 is thereby preferably so long that the bending is possible, if the head 20 is still positioned at the opening of the distal end 14 of the shaft 15 as well as if the head 20, as shown in FIGS. 1 and 2, is shifted out of the shaft 15. Preferably the length of section 25 has an amount of more than some centimeters, preferably more than 10 cm. The bending of endoscope 10 is only slightly hindered by the stiffness of the capillary tube 22a, because section 25 is configured in a corresponding flexible manner. The hose 18 is also made of a flexible material, preferably plastic, preferably PEEK or PA, that only slightly hinders the bending of the endoscope. The tensile-force-proof pull wire 27 also opposes no remarkable resistance to the bending due to its small diameter. The diameter of the pull element 26, particularly the pull wire 27, is less than the diameter of the capillary tube 22a.

For sampling the head 20 is applied with cryofluid at the inside that is inserted into the head 20 via the capillary tube 22a. Due to the cooling of head 20, portions of the tissue to be sampled freeze to the head 20.

For sampling the cryoprobe 11 is moved in proximal direction. In doing so, the tissue frozen to the head 20 is torn off the remaining tissue. The force required for this is first transmitted via the capillary tube 22a up to the weld connection 29 and therefrom via the pull wire 27 to the weld connection 28. From there the flux of force is via the capillary tube 22a to the head 20. The pull wire 27 thus bridges the non-tensile-force-proof section 25 with regard to force transmission.

It is further possible to connect the pull element 26 only at the connection location 28 with the capillary tube 22a and to guide it through the total length of the cryoprobe 11 up to its proximal end. In this case the capillary tube 22a can be configured from the proximal end up to the connection location 28 completely or in one or more sections of a metallic or non-metallic material that is more flexible than the remaining capillary tube 22a.

It is further possible to connect the distal end of the pull element 26 directly with the head 20, whereas the proximal end of the pull element is connected via the weld connection 29 or another connection with the capillary tube 22a. In this case, the capillary tube 22a can be configured originating from the weld connection 29 or another connection location up to its distal end completely or partly of a material that is more flexible and less tensile-force-proof than the remaining capillary tube 22a.

It is further possible that the capillary tube 22a is completely or in one or more sections formed from a flexible, non-bending resistant and non-tensile-torque-proof material. In this case the pull element 26 is attached with its distal end to the head 20 or an element connected therewith, whereas its proximal end is connected with the proximal end of the cryoprobe 11.

It is indicated that instead of a pull wire 27 also a tensile-force-proof metallic band, wire bundle, a rope, a tube or the like can be used as pull element 26. Also instead of a metallic pull element 26 a non-metallic pull element can be used, the ends of which are also connected with the capillary tube 22a in order to bridge at least the section 25 or longer sections of the capillary tube 22a or the whole capillary tube 22a. The pull element 26 can also be configured as monofilament or as rope from a non-metallic material or from a composite material, e.g. a fiber composite material.

In a preferred embodiment the capillary tube is only flexible in its section 25. The section 25 has typically a length of 10 cm to 30 cm and is limited to a length obtained by the sum of the length of the actively bendable section of the endoscope and the maximum extension length of the cryoprobe 11 out of the endoscope 10 during use. The length of the pull element 26 is dimensioned such that at least the whole length of the flexible section 25 of the capillary tube 22a is bridged. In doing so, the pull element 26 is fixed proximally in a force transmission manner to the capillary tube 22a and distally to the head 20 or to the capillary tube 22a, if the flexible section does not extend up to this location. Because the capillary tube 22a is only soft in section 25 and apart therefrom rigid, the cryoprobe 11 can be handled in the usual manner. It is also ensured that the pull element 26 limits the cross-section of the lumen 21 only along a short length of the hose 18 and thus does not remarkably increase the flow resistance therein.

FIG. 7 illustrates a modified embodiment of the instrument 11 for which the description above applies accordingly on the basis on the introduced reference numerals. However, the instrument 11 according to FIG. 7 is modified compared with instrument 11 according to FIGS. 3 to 6. Its hose 18 is configured with two lumen, in that the fluid channel 22 is arranged parallel to the lumen 21. FIG. 8 illustrates in an enlarged cross-section an exemplary channel arrangement. While the fluid channel 22 can comprise, for example, a circular cross-section, the cross-section of lumen 21 can be configured in a manner deviating from the circular shape, as illustrated in FIG. 8 or can also be circular.

In the embodiment of instrument 11 according to FIGS. 7 and 8, again a pull element 26 is assigned to the hose 18, e.g. in form of a pull wire 27 that can extend, for example, through the lumen 21 and that can be connected with its distal end to the head 20 at a weld seam 24. The pull wire 27 can extend up to the proximal end of the hose 18 in order to transmit tensile forces from there to the head 20.

Further tensile-force-proof elements can be considered as pull elements 26, as e.g. ribbons, profile wires, wire bundles, ropes or the like. The material of the pull element 26 can be a metal or also a non-metal, as e.g. carbon fibers, aramid fibers or the like. As an alternative the pull element 26 can be embedded in the wall of hose 18. However, preferably the pull element 26 is in all embodiments, according to FIGS. 3 to 8, arranged in longitudinal direction of the instrument 11, whereby the pull element 26 is preferably arranged in a straight orientation. Preferably the pull element encircles neither the lumen 21 nor the fluid channel 22, but is arranged substantially parallel thereto.

An embodiment of an inventive cryoprobe comprises a head 20, to which cryofluid is supplied via a capillary tube 22a. A hose 18 serves for removal of the cryofluid, wherein the capillary tube 22a extends through the lumen 21 thereof. The capillary tube 22a comprises a flexible section 25 that is bridged by a pull element 26. In this manner a cryoprobe 11, that can be handled well, is obtained that can be easily and very largely bent and still transmits the necessary tensile forces for sample extraction.

The invention claimed is:

1. A cryoprobe configured for tissue sampling in an upper urinary tract of a patient, the cryoprobe comprising:
    a flexible hollow hose having a distal end and a proximal end;
    a head attached to the distal end of the flexible hollow hose and forming a lumen, the head configured to sample tissue by application of a tensile force;
    a tube within the lumen, at least a portion of the tube extending into the lumen and being positioned offset from a center longitudinal axis of the flexible hollow hose, the tube having a distal end and a proximate end and forming a fluid channel within the lumen and the tube having at least one first section being flexible and bendable, the tube having a second section having a tensile strength greater than the at least one first section, the at least one first section disposed between the second section and the proximate end of the tube;
    a nozzle inserted into the distal end of the tube at the at least one flexible and bendable first section, the nozzle projecting from the distal end of the tube in a distal direction; and,
    a single pull element connected to the second section and extending through the lumen and extending over the at least one flexible and bendable first section of the tube, wherein the cryoprobe including the single pull element within the flexible hollow hose is flexibly bendable by at least 90 degrees.

2. The cryoprobe according to claim 1, wherein the tube is a capillary tube configured to allow delivery of a cryofluid.

3. The cryoprobe according to claim 2, wherein the capillary tube consists of steel.

4. The cryoprobe according to claim 2, wherein the single pull element is largely arranged parallel to the capillary tube.

5. The cryoprobe according to claim 2, wherein the diameter of the single pull element is smaller than the difference between the diameter of the lumen and the outer diameter of the capillary tube.

6. The cryoprobe according to claim 1, wherein the single pull element is connected by weld seams to the head.

7. The cryoprobe according to claim 6, wherein the weld seams are longitudinally orientated from the distal to the proximal ends of the flexible hollow hose.

8. The cryoprobe according to claim 6, wherein the weld seams are arranged in the same angular position with reference to the-a cross-section of the flexible hollow hose.

9. The cryoprobe according to claim 1, wherein the single pull element is formed by one or multiple wires of high strength steel.

10. The cryoprobe according to claim 1, wherein the fluid channel is connected to a wall of the hose.

11. The cryoprobe according to claim 1, wherein the single pull element is connected to an element connected with the head.

12. The cryoprobe according to claim 11, wherein the single pull element is connected proximal to the head.

13. The cryoprobe according to claim 1, wherein the single pull element is connected to the tube proximal to the head.

14. The cryoprobe according to claim 1, wherein the nozzle has a hollow cylindrical shape.

15. The cryoprobe according to claim 1, wherein the cryoprobe including the single pull element is flexibly bendable within the flexible hollow hose by at least 140 degrees.

16. The cryoprobe according to claim 1, wherein the pull element is made of a wire material that is slack in a non-tensioned condition.

17. The cryoprobe according to claim 1, wherein the second section is tensile-force-proof.

18. The cryoprobe according to claim 1, wherein the at least one first section has less bending resistance than the second section.

19. The cryoprobe according to claim 1, wherein the tube further comprises a third section proximal the at least one first section, the third section having a tensile strength greater than the at least one first section.

20. The cryoprobe according to claim 19, wherein the third section has a tensile strength equal to the second section.

21. The cryoprobe according to claim 19, wherein the pull element is connected to the second section and the third section.

22. The cryoprobe according to claim 21, wherein the single pull element has a distal end connected to the second section and the single pull element has a proximal end connected to the third section.

23. The cryoprobe according to claim 21, wherein the single pull element is connected to the second section and the third section via respective weld connections.

24. The cryoprobe according to claim 23, wherein the respective weld connections are arranged along a common straight line extending parallel to the tube.

25. The cryoprobe according to claim 1, wherein the second section has a tensile strength greater than 900 N/mm2 and the tensile strength of the at least one first section is less than 700 N/mm2.

26. The cryoprobe according to claim 19, wherein the second section and third section each have a tensile strength greater than 900 N/mm2 and the tensile strength of the at least one first section is less than 700 N/mm2.

* * * * *